ns patent [19] [11] 3,939,256
Kazel [45] Feb. 17, 1976

[54] SULFUR RECOVERY PROCESS
[75] Inventor: William G. Kazel, Arvada, Colo.
[73] Assignee: Cyprus Metallurgical Processes Corporation, Los Angeles, Calif.
[22] Filed: Mar. 9, 1972
[21] Appl. No.: 233,352

[52] U.S. Cl.............................................. 423/578 A
[51] Int. Cl.² ........................................ C01B 17/14
[58] Field of Search .................. 423/567, 578, 571; 23/308 S, 312 S, 313

[56] References Cited
UNITED STATES PATENTS

| | | | |
|---|---|---|---|
| 1,798,912 | 3/1931 | Sperr | 423/571 |
| 1,990,602 | 2/1935 | Guernsey | 23/312 S X |
| 2,459,764 | 1/1949 | Yeiser | 23/308 S |
| 2,838,391 | 6/1958 | Kaufman et al. | 23/308 X |
| 3,371,999 | 3/1968 | Skrzec | 423/478 |

FOREIGN PATENTS OR APPLICATIONS

| | | | |
|---|---|---|---|
| 1,001,486 | 8/1965 | United Kingdom | 423/578 |
| 346,835 | 4/1931 | United Kingdom | 423/578 |
| 350,573 | 6/1931 | United Kingdom | 423/578 |
| 1,023,248 | 3/1953 | France | 423/578 |

Primary Examiner—G. O. Peters
Attorney, Agent, or Firm—Sheridan, Ross & Fields

[57] ABSTRACT

A method for the separation and recovery of elemental sulfur from mixtures of foreign material and sulfur which comprises washing the foreign material and sulfur mixture to remove impurities which are deleterious to coalescence of the sulfur particles followed by adding as a cleansing and coalescence agent an alkali metal hydroxide or carbonate, heating the mixture to a temperature above the melting point of sulfur for one hour to coalesce the sulfur particles, and separating the coalesced sulfur from the foreign material.

1 Claim, No Drawings

SULFUR RECOVERY PROCESS

The present invention relates to the recovery of sulfur from an input feed containing elemental sulfur and mineral impurities which has been ground sufficiently fine to permit slurrying. The invention contemplates a pretreatment which consists of an acid or water wash to remove heavy metal and alkaline earth metal impurities which may be acid soluble or water soluble. This pretreatment process is followed by a thermal or heat treatment above the melting point of sulfur and in the range of about 120° – 140°C, in the presence of an alkaline treating agent selected from alkali metal hydroxides and carbonates in the amount of at least five pounds per ton of dry feed or 0.30 grams per 100 grams feed.

BACKGROUND OF THE INVENTION AND PRIOR ART

Elemental sulfur frequently occurs in nature intimately admixed with various mineral impurities. Where such deposits occur at or near the surface, the traditional "Frasch" recovery method cannot be used. As a result, such deposits cannot be economically exploited.

Elemental sulfur may also be produced by certain chemical reactions, and in particular by the oxidation of the sulfide sulfur in metallic sulfides. Specific examples of such oxidation are the electrolytic oxidation of nickel sulfides as taught in U.S. Pat. No. 2,839,461, and the ferric chloride oxidation of copper sulfide as taught in U.S. Bureau of Mines Report of Investigation R.I. 7474.

Where elemental sulfur is produced by chemical reaction, its separation from mineral gangue is required in order that it be of sufficient purity to be a marketable by-product.

Thus, whether the combination of sulfur and mineral impurity occurs in nature or as a result of chemical reactions, the separation of the elemental sulfur and the mineral impurities has become important for economic reasons. Furthermore, there is increasing public concern over the large quantity of sulfur dioxide air contamination which results from the traditional smelting of metallic sulfides. Processes for the conversion of sulfides by the chemical or electro-chemical means cited above which produce elemental sulfur are of public benefit. The low cost and efficient separation of the elemental sulfur produced is an important adjunct to such processes.

In the past, various techniques have been proposed and used commercially to accomplish the separation of sulfur from mineral impurities. These have included melting and filtering, and sublimation. Neither process has proven to be economical in the presence of substantial quantities of mineral impurities. More recently, certain organic solvents have been proposed whereby the sulfur is dissolved and caused to reprecipitate in pure form. Such processes have been shown to be effective in processing low grade sulfur feeds and in producing pure products but are inherently expensive in capital and operating costs.

A process is taught in U.S. Pat. No. 2,537,842, McGauley et al., whereby an aqueous slurry of the sulfur is heated above the melting point of sulfur, and then cooled below the melting point, resulting in the formation of discrete sulfur particles which may be separated by froth flotation from the mineral gangue. However, in the patent there is no provision for removal of certain deleterious acid soluble metal ions associated with elemental sulfur produced from metallic sulfides. Thus, the elemental sulfur wets the mineral impurity surfaces and cannot be separated. Further, in the McGauley patent there is no provision for a prolonged heating time since the patent gives a maximum of 5 minutes and, finally, no provision for basic additives during that treatment.

Additionally, the process of U.S. Pat. No. 3,371,999, Skrzec, is of interest. In separating iron and sulfur chlorides contained in molten sulfur, the patentee passes the molten sulfur by-product countercurrent to a dilute basic aqueous solution to extract the chlorides and collect the elemental sulfur in a pool.

While peripherally relevant, substantial differences exist between the process of Skrzec and the present invention. In the patent there is no suggestion of a pre-wash to remove acid or water soluble deleterious ions. Further, there is no coalescence from mineral impurities and the amounts and nature of the alkaline treating agents or additives are different. Finally, the patent shows uniformly a short treating time while in the present process, optimum coalescence with respect to yield occurs after about 1 hour and optimally 2 hours (120 minutes).

SUMMARY OF THE INVENTION

It has been found that in the separation of elemental sulfur from mineral impurities by the method of heating an aqueous slurry of the elemental sulfur and mineral impurity above the melting point of sulfur (120°C) so that the elemental sulfur coalesces, certain impurities frequently found in nature or in the production of such sulfur by oxidation of metallic sulfides are deleterious and prevent the coalescence of the sulfur. Such deleterious ions may be removed through a preliminary washing of the sulfur and mineral impurity prior to the coalescence step.

The term "foreign material" as used herein includes mineral impurities with which elemental sulfur exists uncombined in nature and may result from concentration of native sulfur ore or from concentrate used in the recovery of metals from their sulfides in ores. The wash medium of the slurry referred to herein may be water or dilute mineral acid. Reference to "washing" the material includes washing with water or dilute mineral acid.

The so-called "deleterious metal ion" concentration which is subject to acidic and/or water removal from elemental sulfur in the present process consists of one or more ions selected from the alkaline earth metals (Group 2a) and heavy metals of the top half of the Periodic Table of Elements (*Handbook of Chemistry and Physics* 49, Chemical Rubber Co., 1968–69). It has been further found that in a typical situation where the raw material is chalcopyrite, zinc sulfide and the like, the principal deleterious or interfering ions subject to acid wash removal are calcium, magnesium, ferric iron, ferrous iron, cupric copper, cuprous copper and zinc.

Also, it has been found that as respects the following elements when present in a form capable of dissolving in a mineral acid at an acid pH of 1.0 and above, and preferably in an acid pH range of about 1.0 to 4.0, the concentrations cited will prevent the coalescence of the sulfur:

| | Grams/Liter of Slurry |
|---|---|
| Calcium | 0.25 |
| Magnesium | 0.25 |
| Ferric Iron } | |
| Ferrous Iron } | 2.0 |
| Cupric Copper } | |
| Cuprous Copper } | 2.0 |
| Zinc | 2.0 |

In a minority of situations, where such elements or ions are present in the slurry but are so chemically bound as to be insoluble at the acid pH utilized, or are below effective concentrations, they are not deleterious and an aqueous non-acid pretreatment may be utilized. It is critical that the concentrate particles have substantially all of the metal ions removed by washing with water, acid or other agent which will dissolve in an aqueous solution having a pH above about 1.0.

A preferred acid-treating agent for the pretreatment is selected from one or more strong mineral acids such as hydrochloric and nitric, which are preferred. When utilized in 0.1N solutions, hydrochloric and nitric acids achieve a solution pH of about 1 which is optimum for the process. Of the other commercial strong mineral acids, sulfuric and ortho-phosphoric present some difficulties in solubilizing the alkaline earth values present and for this reason are not preferred.

It has been found that alkali metal hydroxides and carbonates greatly promote the coalescence of sulfur so that in the product elemental sulfur will collect on a 100-mesh screen, and it has been found that alkaline earth hydroxides such as calcium hydroxide, $Ca(OH)_2$, and ammonium hydroxide, $NH_4OH$, will not operate successfully to coalesce sulfur.

The alkali metal utilized as the hydroxide and carbonate is defined as one or more of Group 1a of the Periodic Table, Handbook of Chemistry and Physics 49, ante, namely lithium, sodium, potassium, rubidium, caesium and francium. Of this group, the commercially feasible members are lithium, sodium and potassium, and these latter are preferred. Using the strong base sodium hydroxide as a standard, at least 5 lbs. must be added per ton of feed to achieve the necessary basic pH for the slurry and it is critical that this amount be used. For sodium hydroxide, a preferred range is 10 lbs. – 30 lbs./ton, a most preferred range is 15 lbs. – 25 lbs./ton, and an operable range is 5 lbs. to over 50 lbs./ton. The less alkaline carbonates are generally utilized in larger amounts, so that their utilization is near the upper end of the 5 lbs. – 50 lbs./ton range. The process works optimally from an economic standpoint at pH 9–11 and above, and, e.g., 1N Na OH imparts a pH of about 13 in a theoretical unbuffered solution.

The precise mechanism by which these additives work is not known, but it is believed that in the presence of these basic alkalis the sulfur may dissolve in the aqueous phase and then reprecipitate in pure form promoting the coalescence.

It is further postulated that the alkali metal treating agents dissolve some of the sulfur as sodium sulfide which precipitates out to serve as a nucleating agent for crystallization. It is known that in the present process after 1 hour a majority of the nucleated sulfur particles are caught on a screen which would pass the original feed.

The slurry density at which the separation is effected is not critical within a broad range. It is only necessary that there be sufficient aqueous phase present so that the solids may move freely and that there be sufficient solids for good sulfur-to-sulfur contact. A range of slurry density of from 20 percent to 50 percent solids by weight is preferred and a slurry density of 30–45 percent most preferred.

The temperature to which the slurry is raised is critical. In order for the sulfur to coalesce, it is necessary to raise the temperature above the melting point of sulfur which is about 120°C. At higher temperatures, sulfur becomes increasingly viscous so that temperatures above 140°C are avoided. The preferred temperature range is 130° to 140°C.

To obtain these temperatures, a suitable pressure device is required. Autoclaves with provision for agitation are a preferred device but a pressure pipe with mixing devices and other pressure devices may be used.

Treatment time and temperature will vary in accord with the objective desired as the degree of coalescence is time dependent. Times in excess of 60 minutes at temperature are required to produce good grade particles coarser than 100 mesh, U.S. Standard, upon cooling. Utilizing somewhat longer times, as for example 1½ to 2 hours, which is preferred, yields of +100 mesh material are improved. At still longer times a pool of sulfur can be obtained. Agitation at moderate speeds is indicated in the process.

The separation of the elemental sulfur and the mineral impurity may be accomplished by quenching the slurry causing the coalesced sulfur to solidify in particles coarser than the mineral feed. The coarse sulfur may then be conveniently removed by screening. Alternately, a liquid pool of coalesced sulfur may be obtained in a pressure vessel maintained at a temperature above the melting point of sulfur and slurry continuously added and removed with periodic removal of the sulfur pool providing continuous operation.

By this invention it is possible to separate sulfur from mineral impurities and obtain a product quality of 85–95% purity and a yield of 65% or greater. The sulfur is of sufficient purity so that it may be melted and filtered to a product of above 99% purity. The residual mineral and sulfur trapped by filtration are readily recycled to the original separation and recovered.

This invention is further illustrated by the following examples which were performed at a slurry pH of about 9–11 using feed passing 100 mesh screen.

EXAMPLE I

Comparative Study — Pretreat Wash and Alkaline Additive

Feed of 300 grams native sulfur concentrate of 50.2% grade was slurried in 1 liter of water. The agitated slurry was held for 120 minutes at a temperature above 120°C. The slurry was cooled and the product screened off on a 100 mesh U.S. Standard screen.

| | Test 1 | Test 2 | Test 3 | Test 4 |
|---|---|---|---|---|
| Pretreatment | None | *Washed | None | *Washed |
| Additive | None | None | 3.6 gm NaOH (1.2 gm/100 gm of feed) | 3 gm $Na_2Co_3$ (1 gm/100 gm of feed) |
| Product (% sulfur) | 95.9% | 94.9% | 95.9% | 97.4% |
| Yield (per cent) | 61.0% | 75.0% | 61.0% | 92.0% |

*The wash was accomplished by a 5-minute wash with .1N HCl and the pH of the solution was 1.5.

The test showed significant yield benefits of 2 and 4 over 1 and 3.

Example I. The slurry was cooled and the product separated on a 100 mesh U.S. Standard screen.

|  | Test 1 | Test 2 | Test 3 |
|---|---|---|---|
| Additive | 2 gm NaOH (2/3 gm/100 gm of feed) | 2 gm NaOH (2/3 gm/100 gm of feed) | 1 gm Na$_2$Co$_3$ (1/3 gm/100 gm of feed) |
| Time at temperature | 135 min. | 78 min. | 240 min. |
| Product (% sulfur) | 96.7 | 96.6 | 92.2 |
| Yield (per cent) | 82.0 | 71.0 | 98 |

EXAMPLE II

Comparative Study Using Several Alkaline or Basic Additives 300 grams of concentrate was produced by the oxidation of chalcopyrite-containing sulfur 25.5%, chalcopyrite 26.6%, pyrite and other minerals 47%. The feed was washed to remove soluble ions utilizing an acid wash-soak of 0.1N HNO$_3$ for 20 minutes with a recorded pH of 3.0. The feed was then slurried in one liter of water and held at 135°C for 135 minutes. The slurry was cooled and the product screened off on a 100 mesh U.S. Standard screen.

Increasing yield of coarse sulfur particles with increasing time is clearly shown.

EXAMPLE IV

Effect of Added Measured Iron Impurity

About 270 grams of a concentrate produced by the oxidation of chalcopyrite-containing sulfur 48%, chalcopyrite 12%, pyrite and other minerals 40%, was slurried in 1 liter of water and held at 135°C ± 5° for 135 minutes. The feed had been washed with acidified water to remove acid-soluble impurities. Subsequently, measured amounts of impurities shown below were added with the following results. The slurry was cooled and the product screened off on a 100 mesh U.S. Standard screen.

|  | Test 1 | Test 2 | Test 3 | Test 4 | Test 5 |
|---|---|---|---|---|---|
| Additive | None | 1 gm NaOH (1/3 gm/100 gm of feed) | 2 gm KOH (2/3 gm/100 gm of feed) | 3 gm NaHCo$_3$ (1 gm/100 gm of feed) | 4 gm Li$_2$Co$_3$ (1/3 gm/100 gm of feed) |
| Product (% sulfur) | 48.7% | 91.7% | 94.1% | 88.4% | 92.4% |
| Yield | 50% | 88% | 68% | 92% | 80% |

|  | Test 1 | Test 2 | Test 3 | Test 4 | Test 5 |
|---|---|---|---|---|---|
| Additive | 2 gm NaOH (.74 gm/100 gm of feed) | 2 gm NaOH (.74 gm/100 gm of feed) | 2 gm NaOH (.74 gm/100 gm of feed) | 2 gm NaOH (.74 gm/100 gm of feed) | 2 gm NaOH (.74 gm/100 gm of feed) |
| Impurity added | None | 1 gm Fe$^{+++}$ | 2 gm Fe$^{+++}$ | 1 gm Fe$^{++}$ | 2 gm Fe$^{++}$ |
| Product (% sulfur) | 86.7 | 89.7 | 85.7 | 86.3 | 85.7 |
| Yield (per cent) | 59.0 | 39.7 | 25.0 | 52.0 | 27.0 |

The results showed substantial increase in yield for each alkaline additive as against the standard in Test 1.

EXAMPLE III

Effect of Heating Time on Yields 300 grams of concentrate produced by the oxidation of chalcopyrite-containing sulfur 49.2%, chalcopyrite 2.3%, pyrite and other minerals 47.7%, was slurried in 1 liter of water and held at 135°C ± 5° for the time periods shown. The feed had been washed to remove soluble ions using the acid pretreatment as set out in The deleterious effect of the heavy metal ion is shown as against the reference standard (Test 1).

EXAMPLE V

Effect of Added Measured Metal Impurities

About 270 grams of concentrate produced by the oxidation of chalcopyrite-containing sulfur 48%, chalcopyrite 12%, pyrite and other minerals 40%, was slurried in 1 liter of water and held at 135°C ± 5° for 135 minutes. The feed had been washed with acidified water to remove acid soluble impurities in the manner of Example II. The amounts of impurities shown were added with the following results. The slurry was cooled and the product separated on a 100 mesh U.S. Standard screen.

|  | Test 1 | Test 2 | Test 3 | Test 4 | Test 5 |
|---|---|---|---|---|---|
| Additive | 2 gm NaOH (.74 gm/ 100 gm of feed) | 2 gm NaOH (.74 gm/ 100 gm of feed) | 2 gm NaOH (.74 gm/ 100 gm of feed) | 2 gm NaOH (.74 gm/ 100 gm of feed) | 2 gm NaOH (.74 gm/ 100 gm of feed) |
| Impurity added | None | 1 gm $Cu^{++}$ | 2 gm $Cu^{++}$ | 0.25 $Ca^{++}$ | 0.25 $Mg^{++}$ |
| Product (% sulfur) | 86.7 | 92.5 | 86.0 | 84.4 | 70.8 |
| Yield (%) | 59.0 | 60.0 | 21.8 | 8.3 | 1.0 |

The deleterious effect of varied metal impurities on yield was noted by comparison to the reference in Test 1.

EXAMPLE VI

Comparison of Effect of $Zn^{++}$ and $Fe^{++}$ on Yield 215 grams of concentrate produced by the oxidation of zinc sulfide-containing sulfur 34.5%, ZnS 34%, mineral impurity 31.5% was slurried in 1 liter of water and held at 135°C ± 5° for 135 minutes. The feed had been washed with acidified water to remove acid-soluble zinc ions using the acid pretreatment as set out in Example I. The slurry was cooled and the product separated on a 100 mesh U.S. Standard screen.

|  | Test 1 | Test 2 | Test 3 |
|---|---|---|---|
| Additive | 2 gm NaOH (.93 gm/100 gm of feed) | 2 gm NaOH (.93 gm/100 gm of feed) | 2 gm NaOH (.93 gm/100 gm of feed) |
| Impurity added | None | 2 gm $Fe^{++}$ | 2 gm $Zn^{++}$ |
| Product (% sulfur) | 77.7 | 56.6 | 82.7 |
| Yield (per cent) | 48.0 | 6.8 | 25.0 |

This example shows the process is effective for zinc concentrates and shows the deleterious effect of zinc and iron ions on yield.

EXAMPLE VII (See Example III)

About 270 grams of a concentrate produced by the oxidation of chalcopyrite-containing sulfur 48%, chalcopyrite 12%, pyrite and other minerals 40%, was washed, slurried in 1 liter of water and held at 135°C ± 5° for the times shown. The slurry was cooled and screened on a 100 mesh U.S. Standard screen.

|  | Test 1 | Test 2 | Test 3 |
|---|---|---|---|
| Additive | 2 gm NaOH (.74 gm/100 gm of feed) | 2 gm NaOH (.74 gm/100 gm of feed) | 2 gm NaOH (.74 gm/100 gm of feed) |
| Time | 30 min. | 60 min. | 235 min. |
| Product (% sulfur) | 88.5 | 90.9 | 86.7 |
| Yield (%) | 23.0 | 19.0 | 59.0 |

This example shows that while a small amount of coalescence occurs very quickly that times in excess of 1 hour are necessary to obtain a high degree of coalescence.

EXAMPLE VIII

Pilot Plant Procedure

The feed for the autoclave was received as a filter cake from the leaching operation. The material was approximately 100% of −200 mesh size and ranged from 10 to 20 percent water. This feed was then charged into a repulp tank where it was slurried with water to approximately 20% solids. The slurry was fed to a filter where water was removed and fresh water as a displacement wash was added to the top.

The wash water removed in the filtering operation was tested to determine the amount of metal ions, such as iron, calcium and other detrimental ones. If the analysis indicated a high level, the feed may be taken back to the slurry tank where it was slurried with 0.1N HCl solution and repulped and refiltered. This operation was continued until the wash water checked below acceptable levels of detrimental metals.

The solids were then repulped to 30 to 40 percent solids, utilizing about 20 lbs. of NaOH per ton of dry feed to give a pH slurry reading of 11 or 30 lbs./ton for a pH of 13 and charged into the autoclave. The autoclave was sealed, the agitator started, and steam was injected into the jacket for the heating cycle. The speed of the agitator is that at which the particles are kept in suspension and a homogeneous slurry is maintained. At the end of the heating cycle, steam was shut off, cooling water was admitted to the jacket, the autoclave cooled down, and when the temperature dropped below 80°C the agitator was slowed down, the bottom valve opened and the autoclave discharged to a screen. The sulfur product was removed as the oversize + 65 mesh, and the fine materials or the tailings proceeded on to a thickener. The sulfur product averaged around 96% elemental sulfur with a recovery of over 85%. The particles were greenish-yellow in color and irregularly shaped.

What is claimed is:

1. A process for the recovery of elemental sulfur from mixtures in which it is present with soluble calcium compound impurities which comprises:
   a. contacting the mixture with water to solubilize calcium ions;
   b. separating the solids content of the treated mixture from the liquid content and washing the solids content to remove said solubilized calcium ions from the solids content;
   c. forming a water slurry of said solids content;
   d. adding to the slurry a surface modifying additive selected from the group consisting of alkali metal hydroxides, alkali metal carbonates, and mixtures thereof to produce an alkaline slurry pH of at least about 9;
   e. heating the slurry to at least the melting point of sulfur for a period sufficient to coalesce substantially all of the sulfur particles, and
   f. recovering the coalesced sulfur from the slurry.

* * * * *